United States Patent
Eder

(10) Patent No.: US 10,142,846 B2
(45) Date of Patent: *Nov. 27, 2018

(54) RELAY ATTACK PREVENTION

(71) Applicant: Manfred Eder, Graz (AT)

(72) Inventor: Manfred Eder, Graz (AT)

(73) Assignee: Infineon Technologies AG, Neubiberg (DE)

( * ) Notice: Subject to any disclaimer, the term of this patent is extended or adjusted under 35 U.S.C. 154(b) by 1045 days.

This patent is subject to a terminal disclaimer.

(21) Appl. No.: 14/010,399

(22) Filed: Aug. 26, 2013

(65) Prior Publication Data

US 2014/0169193 A1 Jun. 19, 2014

Related U.S. Application Data

(63) Continuation-in-part of application No. 13/676,222, filed on Nov. 14, 2012, now Pat. No. 9,558,607.

(51) Int. Cl.

| | |
|---|---|
| *G07C 9/00* | (2006.01) |
| *H04W 12/10* | (2009.01) |
| *H04L 12/26* | (2006.01) |
| *H04L 29/06* | (2006.01) |
| *H04W 12/12* | (2009.01) |

(52) U.S. Cl.
CPC ........ *H04W 12/10* (2013.01); *G07C 9/00309* (2013.01); *H04L 43/08* (2013.01); *H04L 63/123* (2013.01); *H04W 12/12* (2013.01); *G07C 2009/00555* (2013.01)

(58) Field of Classification Search
CPC ..... B60R 25/24; B60R 25/248; G01S 5/0252; H04W 64/00; H04W 88/08; H04W 48/20; H04W 52/0245; H04W 12/00; H04W 12/06; H04W 12/08; H04W 12/12; H04B 17/318; G07C 2009/00412

USPC ...... 340/426.13–426.17, 5.1–5.23, 5.8–5.86, 340/10.1–10.31, 10.4–10.52

See application file for complete search history.

(56) References Cited

U.S. PATENT DOCUMENTS

| | | | | |
|---|---|---|---|---|
| 5,714,937 | A * | 2/1998 | Campana, Jr. | 340/573.1 |
| 5,905,431 | A * | 5/1999 | Mueller et al. | 340/426.17 |
| 5,973,601 | A * | 10/1999 | Campana, Jr. | 340/573.4 |
| 6,101,428 | A * | 8/2000 | Snyder | 701/2 |
| 6,570,486 | B1 * | 5/2003 | Simon et al. | 340/5.1 |
| 6,611,755 | B1 * | 8/2003 | Coffee et al. | 701/482 |
| 6,754,503 | B1 * | 6/2004 | Aldaz et al. | 455/504 |
| 6,757,261 | B1 * | 6/2004 | Olgaard et al. | 370/280 |
| 6,760,599 | B1 * | 7/2004 | Uhlik | 455/525 |
| 7,046,119 | B2 * | 5/2006 | Ghabra et al. | 340/5.72 |
| 7,551,083 | B2 * | 6/2009 | Modes et al. | 340/572.1 |
| 8,040,251 | B2 * | 10/2011 | Spencer | 340/870.16 |
| 2002/0024427 | A1 * | 2/2002 | Banas | 340/425.5 |
| 2002/0029386 | A1 * | 3/2002 | Robbins | 725/56 |
| 2002/0094778 | A1 * | 7/2002 | Cannon et al. | 455/41 |
| 2003/0054847 | A1 * | 3/2003 | Kim et al. | 455/517 |
| 2003/0122673 | A1 * | 7/2003 | Anderson | 340/568.7 |
| 2005/0046546 | A1 * | 3/2005 | Masudaya | 340/5.61 |
| 2005/0223280 | A1 * | 10/2005 | Bergler et al. | 714/18 |
| 2006/0083206 | A1 * | 4/2006 | Min | 370/338 |
| 2006/0136997 | A1 * | 6/2006 | Telek et al. | 726/5 |
| 2006/0252448 | A1 * | 11/2006 | Ichikawa | 455/522 |

(Continued)

*Primary Examiner* — Hai Phan
*Assistant Examiner* — Son M Tang
(74) *Attorney, Agent, or Firm* — Schiff Hardin LLP

(57) ABSTRACT

Embodiments related to transmission of data packets are described and depicted.

25 Claims, 7 Drawing Sheets

(56) References Cited

U.S. PATENT DOCUMENTS

| | | |
|---|---|---|
| 2011/0009129 A1* | 1/2011 | Lim et al. .................. 455/456.1 |
| 2012/0062381 A1* | 3/2012 | Liu et al. ................... 340/572.1 |
| 2012/0264447 A1* | 10/2012 | Rieger, III ................ 455/456.1 |
| 2013/0030747 A1* | 1/2013 | Ganick et al. .................. 702/95 |
| 2013/0079030 A1* | 3/2013 | Kang et al. ................ 455/456.1 |
| 2013/0106576 A1* | 5/2013 | Hinman et al. ............. 340/10.1 |
| 2013/0106577 A1* | 5/2013 | Hinman et al. ............. 340/10.1 |
| 2013/0165144 A1* | 6/2013 | Ziskind et al. ............ 455/456.1 |
| 2014/0085526 A1* | 3/2014 | Takahashi et al. ...... 348/333.02 |
| 2015/0131464 A1* | 5/2015 | Ukita et al. .................. 370/252 |

\* cited by examiner

__RELAY ATTACK PREVENTION__

RELATED APPLICATIONS

This application is a continuation in part (CIP) of copending application Ser. No. 13/676,222, which is filed on Nov. 14, 2012. The entire contents of the copending application Ser. No. 13/676,222 are hereby incorporated herein by reference.

BACKGROUND

A relay attack is a type of hacking technique that can be used to trick wireless passive keyless entry systems. In a typical relay attack, an attacker operates a proxy device (i.e., a relay) to relay a data packet comprising a secret key/code from a sender (e.g., a keyless fob, keyless payment device, etc.) to a valid receiver of the data packet (e.g., an automobile, computer, etc.). For example, a hacker may follow an automobile owner with a relay that forwards a data packet comprising a secret key/code of an automobile's keyless fob to the automobile. If the attacker comes close to the car this triggers a challenge signal from the car (typically an LF frequency at about 125 kHz), which gets relayed to the automobile owner's keyless fob. The keyless fob responds to this challenge by transmitting a data pack that is again relayed by the relay. The relayed data packet will provide the secret key/code to the automobile, disarming the automobile's alarm or unlocking the automobile without the automobile owner knowing.

DETAILED DESCRIPTION

Figure 1:
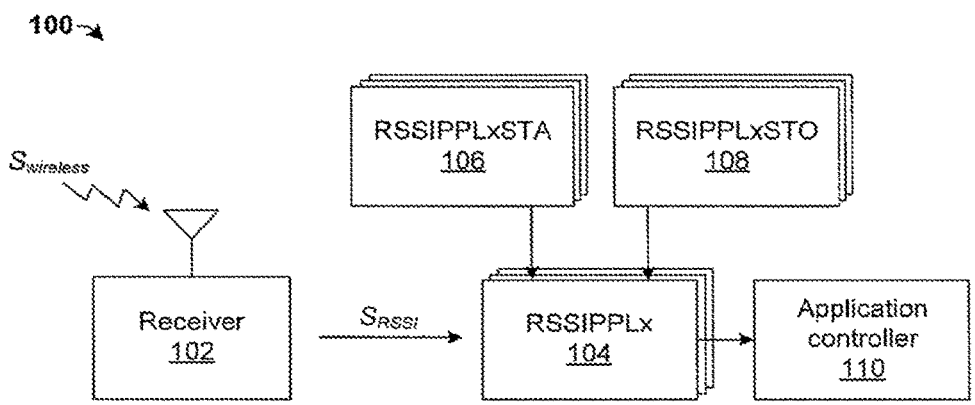
FIG. 1 illustrates a block diagram of some embodiments of a disclosed passive keyless entry receiver system.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details.

Proxy devices (i.e., relays) used in relay attacks typically comprise a transceiver configured to intercept a code and to transmit the intercepted code to a base station at a constant RSSI power level. Therefore, one method that can be used to prevent relay attacks is to transmit an RF response from a keyless fob to a base station (e.g., a car, house, garage, computer, etc.) with different RSSI power levels during a payload of a data packet. Differences between RSSI power levels that change at specific points in time form a fingerprint that is measured by an application controller in the base station. If RSSI power level differences of a received signal occur at the specific points in time, the fingerprint is recognized, indicating that the code is genuine and causing the application controller to grant access to the base station. If the power level differences do not occur at the specific points in time, the fingerprint is not recognized, indicating that the code is not genuine and causing the application controller to not grant access to the base station.

Typically, a receiving system within a base station comprises a radio receiver configured to receive a data packet from a wireless transmitter (e.g., a keyless fob). The radio receiver outputs an RSSI (Receive Signal Strength Indicator) signal, which is measured by an application controller at the specific points in time, so that RSSI differences (e.g., an RSSI value change relative to a peak RSSI level at a beginning of a payload) can be determined. However, to determine RSSI differences, the application controller needs to be active during the specific points in time, which consumes a large amount of power.

The present disclosure relates to a passive keyless entry receiver system that is configured to activate an application controller, upon receipt of an entire payload of a data packet, to determine if peak RSSI levels for a plurality of RSSI steps within a payload match expected values (i.e., if a fingerprint is genuine). The receiver system comprises a receiver configured to receive a wireless signal comprising a data packet having a plurality of power levels within a plurality of pre-defined bit ranges (i.e., RSSI steps) of a payload. The receiver writes a plurality of peak RSSI levels to RSSI peak payload registers configured to store peak RSSI levels corresponding to the pre-defined bit ranges of the payload. Once an entire payload of a data packet has been received, an application controller is configured to determine if the peak RSSI levels stored in the RSSI peak payload registers correspond to an expected sequence of power levels (e.g., power level differences). By activating the application controller upon receipt of the entire payload, the time the application controller is activated is reduced, reducing current consumption of the receiver system.

FIG. 1 illustrates a block diagram of some embodiments of a disclosed passive keyless entry receiver system 100.

The receiver system 100 comprises a receiver 102 configured to receive a wireless signal $S_{wireless}$ (e.g., an RF signal) comprising a data packet having a payload with a code. Based upon the received wireless signal $S_{wireless}$, the receiver 102 is configured to output an RSSI (Receive Signal Strength Indicator) signal $S_{RSSI}$ indicating a power level of the received wireless signal $S_{wireless}$. The RSSI signal $S_{RSSI}$ changes power levels over a plurality of different power levels as the payload is received in a predetermined procession that provides for an expected sequence of power level differences that form a fingerprint.

The receiver system 100 further comprises a plurality of RSSI peak payload registers 104. The receiver 102 is configured to generate RSSI signals that write peak RSSI levels to the plurality of RSSI peak payload registers 104, so that respective RSSI peak payload registers 104 store a peak RSSI level corresponding to a pre-defined bit range (i.e., an RSSI step) in the payload. For example, a first RSSI peak payload register RSSIPPL1 is configured to store a peak RSSI level for a first bit range (i.e., a first RSSI step) of a payload, a second peak payload RSSI peak payload register RSSIPPL2 is configured to store a peak RSSI level for a second bit range (i.e., a second RSSI step) of the payload, etc.

One or more start registers 106 and stop registers 108 are associated with each RSSI peak payload register 104. The one or more start registers 106 define starting positions of RSSI steps within a payload. The one or more stop registers 108 define stopping positions of RSSI steps within the payload. Collectively, the one or more start and stop registers, 106 and 108, define the RSSI steps at which peak RSSI levels are expected to form the expected sequence of power level differences (i.e., the expected fingerprint).

In some embodiments, the start and stop registers, 106 and 108, store bit values, such that the RSSI steps are defined in terms of bits in a payload. For example, a first RSSI peak payload register RSSIPPL1 may be configured to store an initial input power having a peak RSSI level between a first starting bit stored in RSSIPPL1STA having a value of payload bit 1 and a first stopping bit stored in RSSIPPL1STO having a value of payload bit 8. Similarly, a second RSSI peak payload register RSSIPPL2 may be configured to store a peak RSSI level between a second starting bit stored in RSSIPPL2STA having a value of payload bit 9 and a second stopping bit stored in RSSIPPL2STO having a value of payload bit 24.

An application controller 110 is configured to utilize the plurality of peak RSSI levels, stored in the plurality of RSSI peak payload registers 104, to determine if power levels of the payload correspond to an expected sequence of power levels (i.e., the expected fingerprint) of the payload. For example, if the plurality of peak RSSI levels within the RSSI steps is equivalent to peak values expected within the RSSI steps, the application controller 110 determines that the fingerprint of the received wireless signal $S_{wireless}$ is genuine. Alternatively, if the plurality of peak RSSI levels within the RSSI steps is not equivalent to peak values expected within the RSSI steps, the application controller 110 determines that the fingerprint of the received wireless signal $S_{wireless}$ is not genuine.

In some embodiments, the application controller 110 is configured to utilize the plurality of peak RSSI levels, to determine if power levels of the payload correspond to an expected sequence of power levels, after an entire payload of the data packet has been received. By utilizing a plurality of peak RSSI levels stored in the plurality of RSSI peak payload registers 104, the application controller 110 can determine if a fingerprint of a received payload is authentic without being active during receipt of the entire payload (i.e., with a relatively low power consumption).

It will be appreciated that the disclosed receiver system is not limited to any type of keyless entry system, but rather may be used in any type of wireless RF system that is susceptible to relay attacks. For example in some embodiments, the disclosed receiver system may be used in an automobile keyless entry system. In other embodiments, the disclosed receiver system may be used in a keyless payment device.

Figure 2:
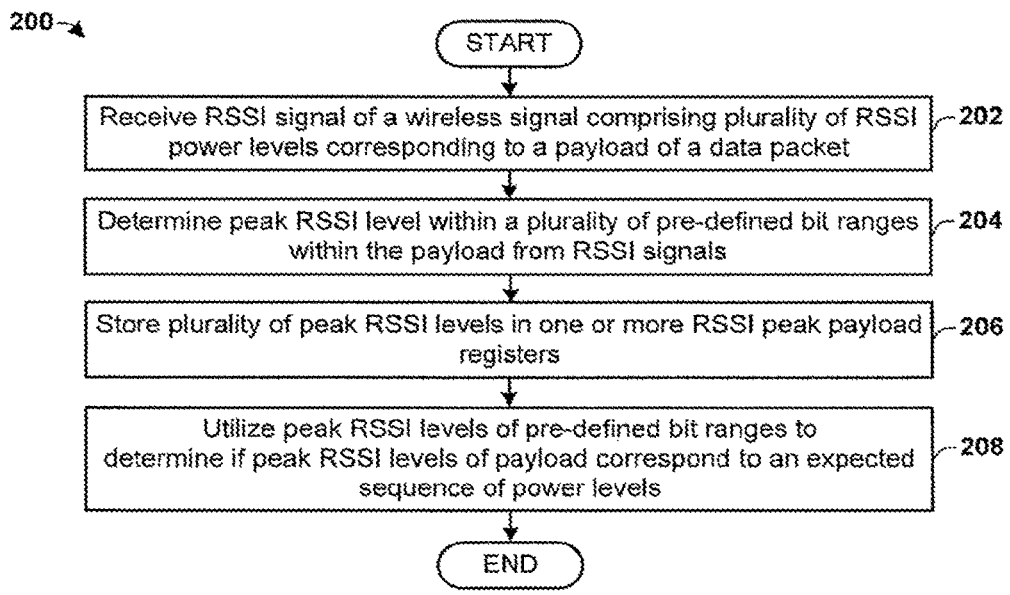
FIG. 2 is a flow diagram of an example method of preventing a relay attack in a passive keyless entry receiver system.

FIG. 2 is a flow diagram of some embodiments of a method 200 of preventing a relay attack in a passive keyless entry receiver system.

At 202, an RSSI (receive signal strength indicator) signal of a wireless signal is received. The RSSI signal comprises a plurality of different RSSI power levels corresponding to a payload of a data packet, transmitted by the wireless signal, which comprises a code that grants access to a keyless entry system. The payload changes between the plurality of different RSSI power levels in a predetermined sequence. For example, in some embodiments the power level of the RSSI signal is configured to vary after a pre-determined number of bits of a payload. The predetermined sequence defines a fingerprint of the payload.

At 204, peak RSSI levels corresponding to a plurality of pre-defined bit ranges (i.e., RSSI steps) within the payload of the data packet are determined.

At 206, the plurality of peak RSSI levels is stored in one or more RSSI peak payload registers. In some embodiments, a peak RSSI level for a first RSSI step comprising a first pre-defined range is stored in a first RSSI peak payload register, a second peak RSSI level for a second RSSI step comprising a second pre-defined range is stored in a second RSSI peak payload register, etc.

At 208, the peak RSSI levels of the plurality of pre-defined bit ranges are utilized to determine if peak RSSI levels of the payload correspond to expected sequence of peak RSSI levels (e.g., an expected sequence of peak RSSI level differences). In some embodiments, the peak RSSI levels of the plurality of pre-defined bit ranges are utilized to determine if peak RSSI levels of the payload correspond to expected sequence of peak RSSI levels once an entire payload of a data packet is received. By determining if the peak RSSI levels of payload correspond to expected sequence of peak RSSI levels after an entire payload has been received, the authenticity of a received fingerprint of a payload is able to be determined in a relatively short time period.

Figure 3:
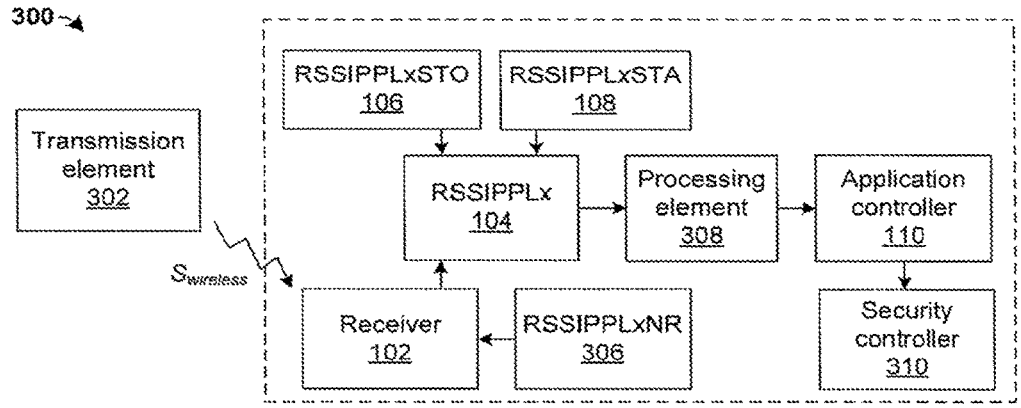
FIG. 3 illustrates a block diagram of some embodiments of a disclosed passive keyless entry receiver system.

FIG. 3 illustrates a block diagram of some embodiments of a disclosed passive keyless entry system 300.

Receiver system 300 comprises a transmission element 302 configured to transmit a wireless signal $S_{wireless}$ (e.g., an RF signal) to a base station 304 comprising a receiver 102. The wireless signal $S_{wireless}$ comprises a data packet having a payload that comprises a code that grants access to the base station 304. In some embodiments, the base station may comprise an automobile, a house, a garage, etc.

The receiver 102 is configured to receive the wireless signal $S_{wireless}$ and based thereupon to write peak RSSI levels of the wireless signal $S_{wireless}$ to one or more RSSI peak payload registers 104. The RSSI peak payload registers 104 store peak RSSI levels for different RSSI steps defined by start and stop bits stored in start registers 106 and stop registers 108. In some embodiments, a number of RSSI steps in a payload are stored in a register 306, which can be accessed by the receiver 102. In some embodiments, a number of RSSI steps are equal to the number of different power levels of an expected fingerprint of a payload within the data packet.

A processing element 308 is connected to the one or more RSSI peak payload registers 104. The processing element 308 is configured to analyze the peak RSSI levels of the payload stored in the one or more RSSI peak payload registers 104. In some embodiments, the processing element 308 is configured to analyze the peak RSSI levels of the payload to determine if a fingerprint of the payload is genuine upon receipt of an entire payload. In other embodiments, the processing element 308 is configured to analyze the peak RSSI levels of the payload to determine if a fingerprint of the payload is genuine during receipt of the payload. In some embodiments, the processing element 308 is configured to determine peak RSSI level differences between peak RSSI levels stored for different RSSI steps and to compare the calculated peak RSSI level differences to expected RSSI differences.

The processing element 308 is in communication with an application controller 110 (e.g., a micro-controller) configured to operate in a normal operating mode or in a sleep mode. In the normal operating mode, the application controller 110 has a full functionality (e.g., to constantly monitor RSSI levels) that causes the application controller 110 to operate with a first power consumption level. In the sleep mode, the application controller 110 has a limited functionality that causes the application controller 110 to operate with a second power consumption level that is less than the first power consumption level.

During receipt of the payload, the application controller 110 may be operated in sleep mode to reduce the power consumption. Upon receipt of the entire payload, the application controller 110 may be switched to normal operating mode to determine if the fingerprint of the payload is genuine based upon analysis of the processing element 308. By determining the authenticity of a fingerprint of a payload from stored peak RSSI levels of different RSSI steps in different RSSI peak payload registers, the application controller 110 does not have to actively measure the peak RSSI levels during reception of a data packet and therefore can be operated in a sleep mode that reduces the overall power consumption of the base station 304.

For example, if the processing element 308 determines that the peak RSSI levels of a received payload have a magnitude and temporal component equivalent to an expected peak RSSI levels for pre-defined bit ranges (i.e., that a fingerprint of the received payload is genuine), the authenticity of the fingerprint can be communicated to the application controller 110 upon entering normal operating mode. The application controller 110 can subsequently operate a security element 310 to grant access to the base station 304. Alternatively, if the processing element 308 determines that the peak RSSI levels of a received payload have a magnitude and temporal component that is not equivalent to an expected peak RSSI levels for pre-defined bit ranges (i.e., a fingerprint of the received payload is not genuine), the falsity of the fingerprint can be communicated to the application controller 110 upon entering normal operating mode. The application controller 110 can subsequently operate a security element 310 to deny access to the base station 304.

In some embodiments, the processing element 308 is configured to generate an end of message interrupt, which is sent to the application controller 110. Upon receiving the end of message interrupt, the application controller 110 queries a result bit to evaluate an authenticity of the payload after receipt of the entirety of the payload. In other embodiments, upon receipt of a genuine RSSI fingerprint the processing element 308 is configured to generate an end of message interrupt, which is sent to application controller 110, to indicate that a genuine RSSI fingerprint has been received and that causes the application controller 110 to grant access to the base station 304.

Figure 4A:
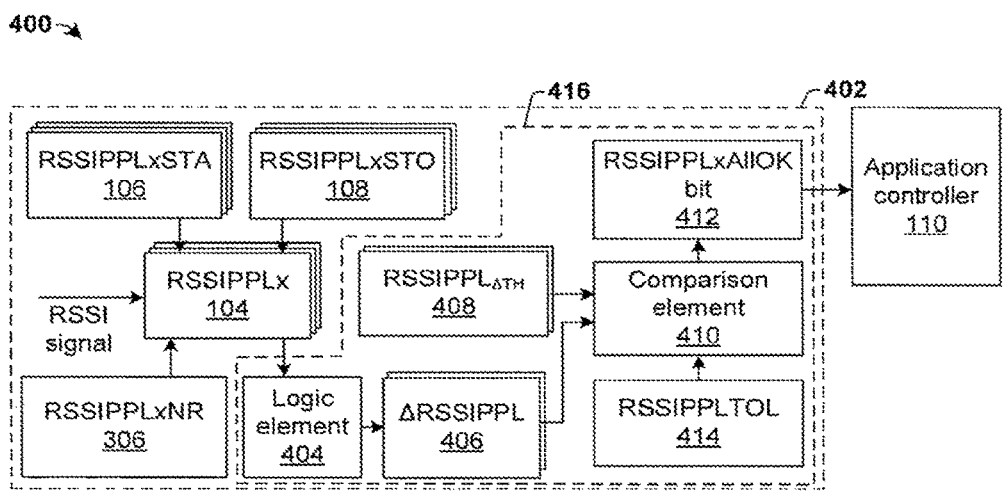
FIG. 4A illustrates a more detailed example of a block diagram of an embodiment of a disclosed passive keyless entry receiver system.

FIG. 4A illustrates a more detailed embodiment of a block diagram of a disclosed passive keyless entry receiver system 400. The passive keyless entry receiver system 400 comprises an RF block 402 (e.g., a receiver chip) and an application controller 110.

The RF block 402 comprises a plurality of RSSI peak payload registers 104 and a processing unit 416. The RSSI peak payload registers 104 are configured to store peak RSSI levels for different RSSI steps defined by start and stop bits stored in registers 106 and 108, as described above. In some embodiments, a number of RSSI steps are stored in a register 306. The processing unit 416 is configured to read peak RSSI levels from the RSSI peak payload registers 104 and to write a result bit into result bit register 412 based upon the peak RSSI levels.

In some embodiments, the processing unit 416 comprises a difference calculation element 404 configured to read the peak RSSI levels from RSSI peak payload registers 104 and to calculate RSSI differences between the peak RSSI levels (e.g., between peak RSSI levels stored in RSSIPPL1 and the other RSSIPPLx registers). The calculated RSSI differences may be stored in one or more RSSI difference registers 406. The calculated RSSI differences are provided to a comparison element 410 that is configured to compare the calculated RSSI differences to expected RSSI differences that are stored in one or more registers 408.

If the comparison element 410 determines that the RSSI differences are not equivalent to the expected RSSI differences within RSSI steps of the payload, the comparison element 410 sets a results bit in result bit register 412 to a first value indicating that the fingerprint of the received signal is not genuine. If the comparison element 410 determines that the RSSI differences are equivalent to the expected RSSI differences within RSSI steps of the payload, the comparison element 410 sets a results bit in a result bit register 412 to a second value indicating that the fingerprint of the received signal is genuine. In some embodiments, the result bit can be automatically reset to a first value at the beginning of the payload. An application controller 110 is configured to query the result bit register 412 to access the result bit and to grant access to the processing unit 416 based on a value of the result bit.

In some embodiments, the comparison element 410 is configured to read a tolerance value from a separate tolerance register 414 configured to store one or more tolerance values and to determine if the calculated RSSI differences are within the one or more tolerance values of an expected RSSI differences. In some embodiments, tolerance register 414 is configured to store a tolerance value that is shared between different RSSI steps. In other embodiments, tolerance register 414 is configured to store a plurality of different tolerance values that are used for different RSSI steps. For example, a first RSSI step may have a first tolerance, a second RSSI step may have a second tolerance, etc.

Because the application controller 110 does not constantly monitor values of the peak RSSI levels, the application controller 110 can simply use the result bit of the radio part and therefore the application controller 110 can stay in sleep mode during payload reception. The result is that the total current consumption of the receiver system 400 can be further reduced.

Figure 4B:
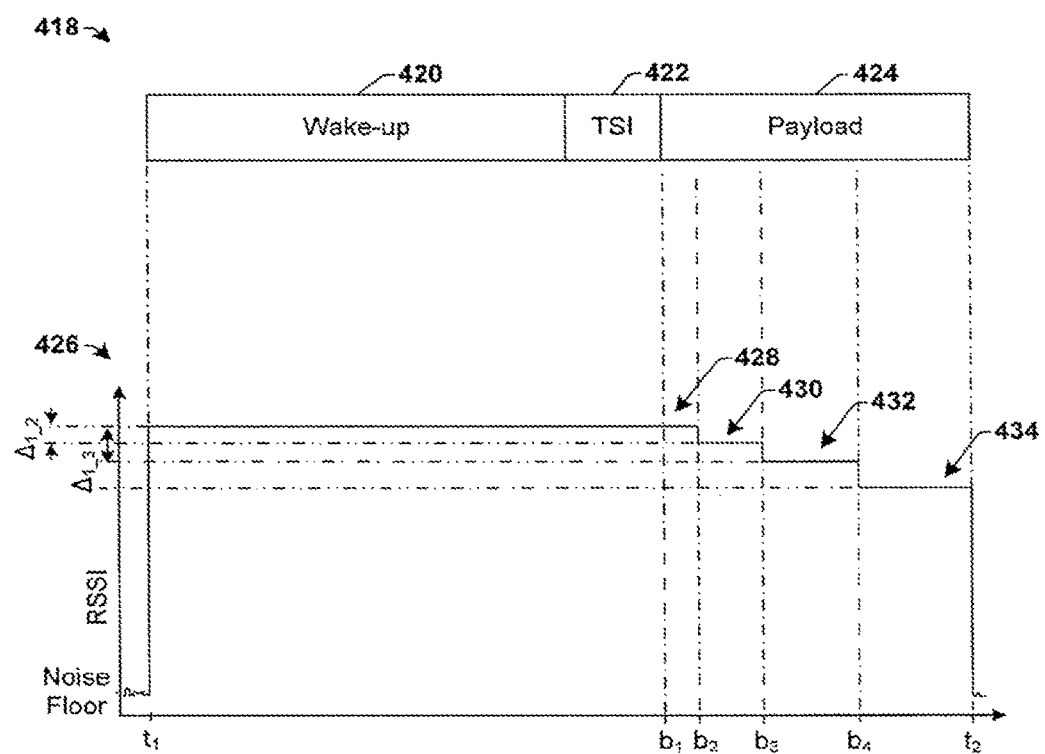
FIG. 4B illustrates an example timing diagram illustrating operation of the disclosed passive keyless entry receiver system.

FIG. 4B illustrates a data packet 418 and an associated timing diagram 426 illustrating operation of passive keyless entry receiver system 400.

The data packet 418 comprises a wake-up section 420, a TSI (transport session identifier) section 422, and a payload section 424. The wake-up section 420 comprises a data sequence that tells if a receiver is to be activated to receive the data packet. For example, if the data sequence of the wake-up section 420 matches an expected wake-up sequence then the receiver will stay on. If the data sequence does not match the expected wake-up sequence then the receiver will turn off. The TSI (transport session identifier) section 422 comprises a data sequence that indicates that the payload is beginning. The payload section 424 comprises a code that grants access to a base station.

As shown in timing diagram 426, the data packet 418 is received at time $t_1$. The payload section 424 of the data packet 418 comprises a RSSI level (y-axis) that varies between a plurality of different power levels as a function of time (x-axis) during the payload section of the data packet. For example, timing diagram illustrates a payload having 4 RSSI steps. A first RSSI step 428 is present between a first payload bit b1 and a second payload bit b2 (e.g., b1=1 bit and b2=8 bits), and has an RSSI signal with a first power level. A second RSSI step 430 is present between the second payload bit b2 and a third payload bit b3 (e.g., b2=8 bits and b3=24 bits), and has an RSSI signal with a second power level. A third RSSI step 432 is present between the third payload bit b3 and a fourth payload bit b4 (e.g., b3=24 bits and b4=48 bits), and has a RSSI signal with a third power level. A fourth RSSI step 434 is present between the fourth payload bit b4 and a fifth payload bit corresponding to the end of the payload at time $t_2$, and has a RSSI signal with a fourth power level.

Once a last payload bit has been received at time $t_2$ the entire payload is received and a processing unit is configured to calculate RSSI differences between peak RSSI levels that have been stored in RSSI peak payload registers. For example, a first difference $\Delta_{1\_2}$ is determined between a peak RSSI level of the first RSSI step 428 and a peak RSSI level of the second RSSI step 430. A second difference $\Delta_{1\_3}$ is determined between a peak RSSI level of the first RSSI step 428 and a peak RSSI level of the third RSSI step 432. If the differences are within a tolerance of an expected difference, a result bit is set to a value that indicates that the received fingerprint is genuine.

Figure 5:
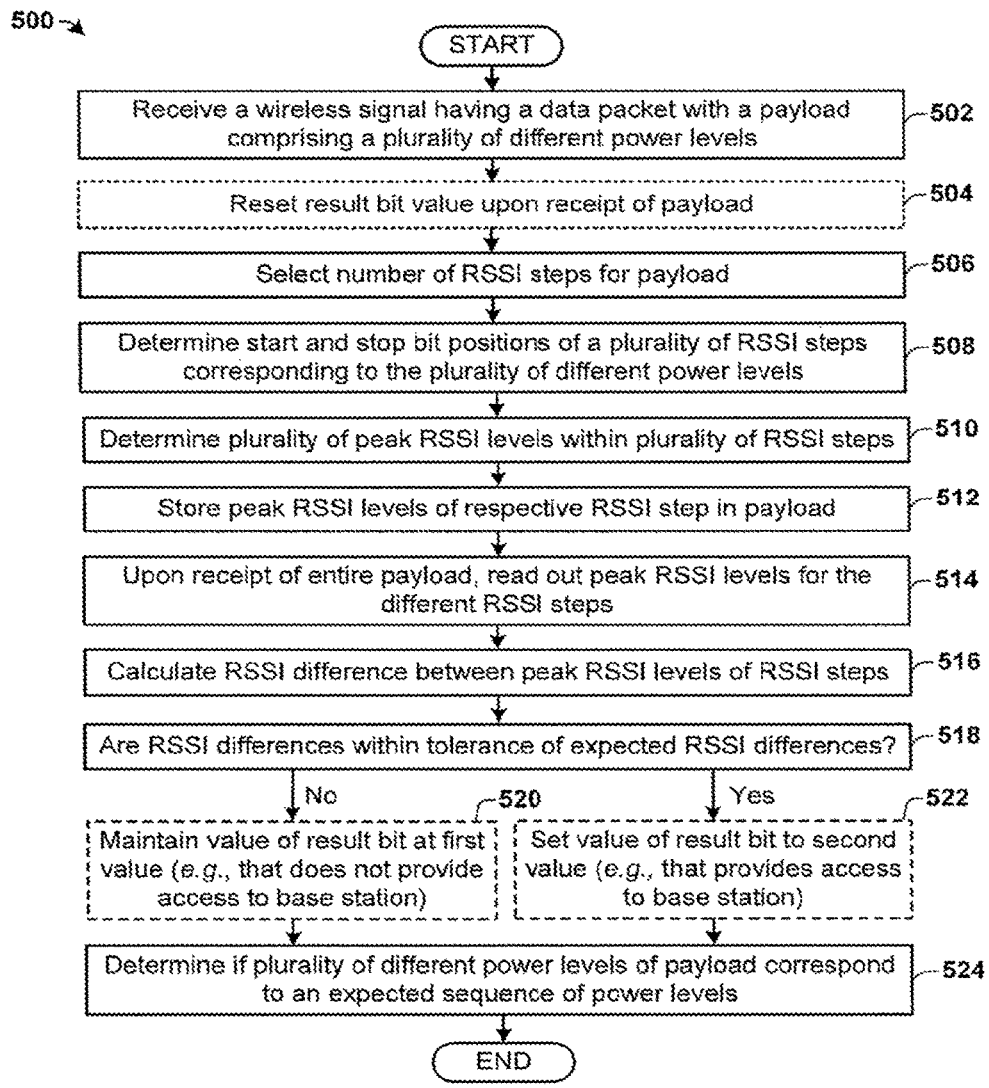
FIG. 5 is a flow diagram of an example method of preventing a relay attack in a passive keyless entry receiver system.

FIG. 5 is a flow diagram of an exemplary method 500 of preventing a relay attack in a passive keyless entry receiver system.

While the disclosed methods (e.g., methods 200 and 500) are illustrated and described below as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects of the description herein. Further, one or more of the acts depicted herein may be carried out in one or more separate acts and/or phases.

At 502, a wireless signal having a data packet with a payload comprising a plurality of different power levels is received.

At 504, a value of a result bit may be reset upon receipt of the payload of the data packet. For example, at a beginning of a received payload of a data packet the result bit may be reset to a first value (e.g., a "0").

At 506, a number of RSSI steps may be selected for the payload. The number of RSSI steps may be equal to a pre-defined number of power level differences within an expected fingerprint of the payload.

At 508, start and stop positions for each RSSI step corresponding to the plurality of different power levels are determined. In some embodiments, the start and stop positions may comprise times. In other embodiments, the start and stop positions may comprise bit positions within the payload that RSSI steps start and stop. For example, a first RSSI step may start at a $1^{st}$ bit of the payload and end at an $8^{th}$ bit of the payload. In some embodiments the start and stop positions are read from separate registers configured to store start and stop positions.

At 510, a plurality of peak RSSI levels are determined within plurality of RSSI steps For example, a first peak RSSI level is determined within a first RSSI step, a second peak RSSI level is determined within a second RSSI step, etc.

At 512, peak RSSI levels for respective RSSI steps in the payload are stored in RSSI peak payload registers.

At 514, peak RSSI levels for the different RSSI steps are read out from RSSI peak payload registers upon receipt of the entire payload.

At 516, differences between peak RSSI levels of different RSSI steps are calculated. For example, a difference between a first peak RSSI level and a second peak RSSI level is calculated, a difference between a first peak RSSI level and a third peak RSSI level is calculated, etc.

At 518, the RSSI differences are compared to expected RSSI differences.

In some embodiments, if the RSSI differences are not within a tolerance of the expected RSSI differences, a result bit value is maintained at a first value (e.g., a "0") that does not provide access to a keyless entry system, at 520.

In some embodiments, if the RSSI differences are within a tolerance of the expected RSSI differences, a value of a result bit set is to a second value (e.g., a "1") that provides access to a keyless entry system, at 522.

At 524, an authenticity of a fingerprint (i.e., if plurality of different power levels of payload correspond to an expected sequence of power levels) of the received wireless signal is determined. In some embodiments, a value of the result bit is queried to determine if the plurality of different power levels of the payload correspond to an expected sequence of power levels. If the plurality of peak RSSI levels within the RSSI steps corresponds to peak values expected within the RSSI steps, a fingerprint of the received wireless signal is authentic. Alternatively, if the plurality of peak RSSI levels within the RSSI steps does not correspond to peak values expected within the RSSI steps, the fingerprint of the received wireless signal is not authentic. In other embodiments, an interrupt signal may be generated based upon the power level differences, wherein the interrupt signal signals an authenticity of the fingerprint of the received wireless signal.

Figure 6:
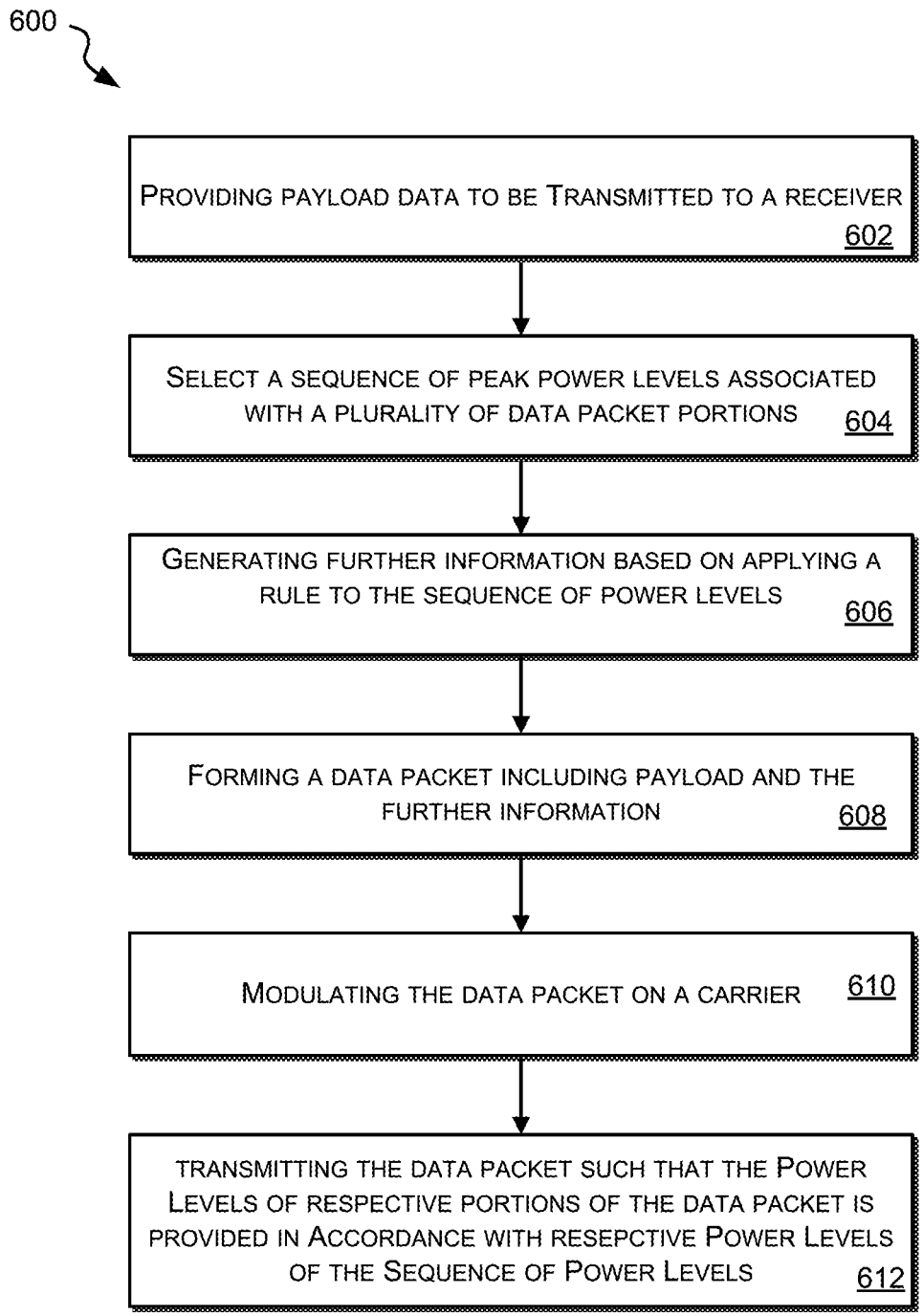
FIG. 6 is a diagram of a further example method

Further embodiments will now be described with respect to FIGS. 6 to 8. The embodiments relate to a configurable fingerprint in which the transmitter can select for each data packet a specific signal power level fingerprint. In order to transmit the configurable fingerprint to the receiver, information on the transmitted RF power fingerprint is additionally part of the payload. This information is however not transmitted plain which would allow potential attackers to gain information in relay attacks. Rather this information is transmitted in an encrypted and/or scrambled manner. For example an indirect addressing method may be used to transmit this information. The information on the transmitted RF power fingerprint can then be used at the receiver together with the actual received signal strength for making a decision on the validity of the received data frame.

In view of the configurable fingerprint a large flexibility and easy adaptability in forming RSSI fingerprints is provided. Therefore, the above may also be referred to as a Softradio configuration approach. Furthermore this method establishes a powerful instrument against Relay Attacks. With this technique the RSSI fingerprint can be varied on each transmission of a data packet. For example, when implementing in a passive keyless entry system, the RSSI fingerprint can be varied with each transmission of a keyless entry data packet started by a key fob button press. In some embodiments of a passive entry system, the car may detect that a car owner wants to enter the door and sends a LF (low frequency) signal from the car to the fob. The fob transmits then with the RF signal back to the car.

The configuration of the fingerprint by the transmitter makes it even more difficult for attackers and therefore gives additional prevention against relay attacks. For example, the signal power level fingerprint may be configured by selecting for each transmitted data packet a specific power level sequence from a group of possible power level sequences. In some embodiments, a power level sequence for a data packet may be selected from a predefined group of power level values such that the first power level of the sequence is randomly selected from the values existing in the group, the second power level of the sequence is randomly selected from the values existing in the group etc. It is to be noted that instead of randomly selecting from a group, other selection schemes may be used to obtain a specific power level sequence for each data packet. Furthermore, in some embodiments the start and stop bit positions for each power level within the data packet may be selected. The selected start stop positions may be combined with the selected level sequence to define unique power level steps, e.g. by selecting for each power level of the sequence certain bits of the payload as a start of the respective power level step and a stop of the respective power level step. In some embodiments, both, the levels of the sequence and the start and stop bit positions are selected, for example in a random or pseudo-random manner. For example, the selection of start and stop bits may be such that the data packet is transmitted with different length of the bit groups corresponding to one transmit power level. For example the first power level of the sequence may be during the transmissions of bits 0 to 3 (4 bit length), the second power level of the sequence during the transmission of bits 4 to 7 (4 bit length) and the third power level of the sequence may be during the transmission of bits 8 to 15 (8 bit length) etc.

In other embodiments however, a same step size (number of bits) may be used for each data packet. The data packets are transmitted such that at least a group of data packet portions (e.g. specific contiguous bit groups within the payload of the data packet) of the transmitted wireless signal of the data packet is transmitted in correspondence with the selected sequence of power levels.

In order to enable the receiver to identify the expected fingerprint which was selected by the transmitter, the transmitter transmits further information in the payload data of the data packet which is used at the receiver to identify the configured fingerprint, i.e. the configured sequence of power levels. The further information which may be referred herein as fingerprint identifier information is generated from the sequence of power levels by applying a pre-known rule to the sequence of power levels. Since the pre-known rule is also known to the receiver, the configured sequence of power levels can be identified from the transmitted fingerprint identifier information by applying the reverse of the rule to the fingerprint identifier. While the applied rule is known to both, the transmitter and receiver, the rule is otherwise kept secret. In some embodiments, the fingerprint identifier information may include information or may be based on information which is transmitted to provide other functions such as a counter number of a counter or an identifier of the receiver. In some embodiments, the rule may be a rule which assigns to each power level an identifier. For example, according to one embodiment, the fingerprint identifier information may be related to a specific storage location such as a specific register address in which a specific power level value is stored at the receiver. In some embodiments, the stored power level value may include relative power levels in dB, for example by storing for each step the power level of this step in relation to the power level of the directly precedent step of the sequence. Likewise, the power level of this step in relation to the power level of a successive step of the sequence may be stored. Thus, by knowing the relative power levels in dB, the full sequence of power levels can be constructed. However, it may be understood that other forms of storing relative or non-relative power levels may be used in other embodiments.

To transmit a further data packet, a new fingerprint, i.e. power level sequence, is selected by the transmitter in embodiments. A mechanism may be provided to ensure that the new fingerprint is different from previously sent fingerprints. This may include the usage of random or pseudo random numbers. In addition, information related to the number of power level steps may be transmitted. The flexibility of the above configuration of fingerprints may be increased by including within the fingerprint identifier information other configurable parameters of the rule used for identifying the configurable fingerprint at the receiver. Such parameters may include for example a reverse order bit indicating whether the sequence of power level determined based on fingerprint identifier information is to be expected in the fingerprint power level sequence of the data packet in a reversed order. Furthermore, a bit may be included in the fingerprint identifier information which indicates whether the power level values identified by the receiver (for example the power level values stored within assigned registers of the receiver) are to be modified by a certain factor. For example, the power levels of the power level sequences may be determined to be only half of the stored power level value based on an indication in the further information. In general it is to be understood that the increase in configurable parameters may increase the security of the system against relay attacks.

A method 600 implemented at a transmitter according to one embodiment will now be described with respect to FIG. 6. The method starts at 602 with providing payload data to be transmitted to a receiver. At 604, a sequence of Peak Power Levels associated with a plurality of data packet portions of the data packet to be transmitted is selected. In order words, the variable fingerprint imprinted on the data packet is selected. As outlined above, the selection may use a scheme ensuring that the fingerprint is different for different transmitted data packets. At 606, further digital information is generated by applying a rule to the sequence of Peak Power Levels. In other words, the further information which is the fingerprint identifier information is generated by coding peak power level fingerprint selected in 604 according to the predetermined rule. At 608, a data packet is formed wherein the data packet includes the payload and the further information generated in 606. At 610, the data packet is modulated on a carrier signal and at 612 the data packet is transmitted such that respective portions of the data packet are transmitted in accordance with corresponding Peak Power Levels assigned to respective data packet portions by the sequence of Peak Power Levels selected in 604.

It is to be noted here the providing of Peak Power Levels is to be distinguished from the normal generation of transmission signal waveforms by modulation schemes such as ASK, FSK or PSK. While the application of a modulation scheme provides for the data packet varying different signal values but with no variation of the peak power level, the additional applying of a sequence of different signal level strength in different portions of the data packet further modifies such modulated signals by using different peak power levels. Thus, the applying of the different peak power levels in specific data packet portions may be regarded as an additional scaling of the modulated signal, e.g. proportional to the associated peak power for this data packet portion. Signals portions of the data packet are scaled with different Peak Power factors to apply different peak power levels for each selected data packet portion. The scaling may be provided concurrently with the modulation on a carrier or may be done after the modulation on a carrier. The providing of the additional Peak Power sequence may for example be provided by varying the gain of a variable gain amplifier stage. It is to be noted that many variations of the method 600 are possible. Furthermore, some steps of the method 600 may be combined or executed in a different order. For example, instead of selecting the sequence of peak power levels and deriving there from the further information, in a modification of the method 600 the further information may be selected and the sequence of peak power levels may be derived from the selected further information.

Figure 7:
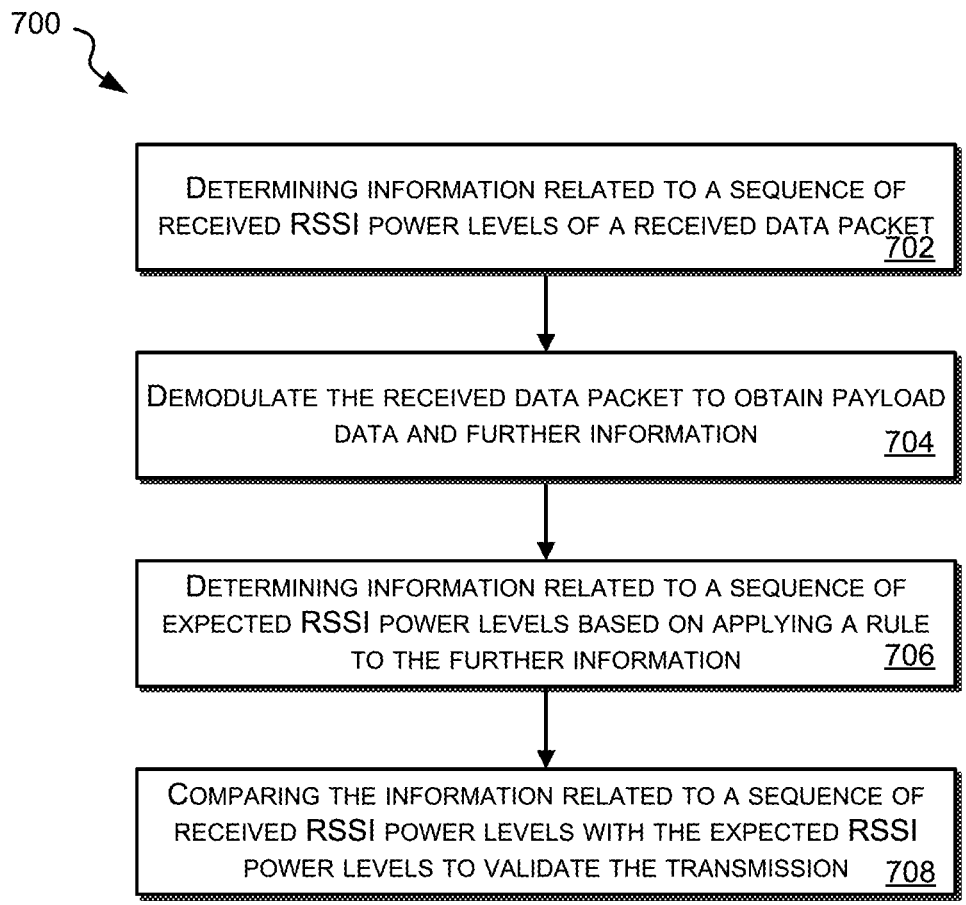
FIG. 7 is a further diagram of a further example method.

Referring now to FIG. 7, a further embodiment of a method 700 implemented at a receiver will be described. The method starts at 702 with determining information related to a sequence of received RSSI power levels of a received data packet. In other words, the transmitted power level fingerprint of the data packet is determined at the receiver based on the further information transmitted in the data packet. The sequence of received RSSI power levels may for example be a sequence of Diff RSSI power levels. Diff RSSI power levels identify a difference or a logarithmic difference (in dB) or other relations between respective adjacent RSSI power levels in the sequence.

At 704 the received signal is demodulated to obtain the digital content of the data packet. The digital content of the data packet may include information which is usually transmitted in data packets as payload and the further information for deriving an expected fingerprint of the data packet. At 706 information related to a sequence of expected RSSI power levels is determined based on applying a rule to the further information. In other words, the expected power level fingerprint is derived from the digital content of the data packet transmitted within the data packet. As outlined above, a first rule may be applied at the transmitter to transform the fingerprint to the fingerprint identifier information which is transmitted within the data packet as further digital information. By applying the reverse of this rule, the receiver is capable of transforming the transmitted fingerprint identifier information back to obtain the expected fingerprint of the data packet. The rule applied by the receiver may for example include an indirect addressing of registers in which predetermined values of specific peak levels are stored as will be described with respect to FIGS. 8 and 9 in more detail. Finally, at 708, the information related to the received RSSI Power levels and the information related to the expected RSSI Power levels are compared in order to validate the transmission as being from a trusted transmitter.

Figure 8:
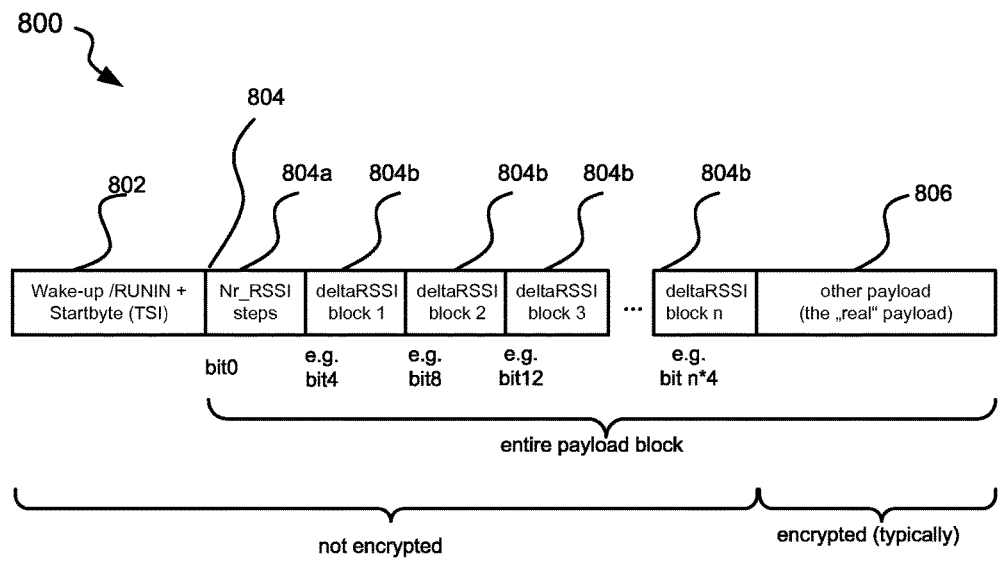
FIG. 8 is an example of a data packet.

Referring now to FIG. 8, an example of a data packet 800 which may be used in the above described embodiments will be explained. The data packet 800 includes a first data packet section 802 including preamble and other information such as Wake-up/RUNIN and Startbyte information. Wake-up may provide a certain bit sequence which is typically used when the receiver is not activated 100% of the time. The receiver is working in a so called polling mode in this case. A RUNIN sequence is typically transmitted so that the receiver can get in synchronization with the transmitted data rate. In the Wake-up sequence, the RUNIN sequence is already integrated. A second data packet section includes the further information for generating the expected fingerprint at the receiver based upon a pre-known rule as described above. In the embodiment of FIG. 8, the further information includes a first block 804*a* which contains the number of RSSI steps of the sequence of RSSI power levels. It is to be noted that block 804 may in other embodiments include other data such as an identifier that the expected sequence should be reversed etc.

The further information includes the fingerprint identifier information which in the embodiment shown in FIG. 8 includes for each Diff RSSI step of the sequence a specific payload block of information. Each payload block 804*b* contains in the embodiment of FIG. 8 a register address of the register which stores at the receiver the respective RSSI power level assigned to this RSSI step. Since the assignment allowing determining which power level value is stored in which register store is only known to the transmitter and receiver, the respective assignment of register addresses to RSSI power levels forms a non-public rule. A random or pseudo-random selection of such register addresses can therefore provide a random or pseudo-random selection and scrambling mechanism of different power levels within a sequence.

A further payload block 806 is provided which includes other payload data. Such other payload data may include for example an identifier of the transmitter, status information of the transmitter such as a battery status, a counter value which may be used to provide indication whether the transmitter is a valid transmitter etc. It is to be noted that the further fingerprint identifier information can be provided as additional payload which allows using existing data packet formats for the transmission of the further fingerprint identifier information without modifying the data packet format or structure.

In some embodiments, the power level fingerprint may be impressed to the data packet only within the section of payload block 806. In some embodiments, the power level fingerprint may be impressed to the data packet only within the section 804. In some embodiments, the power level fingerprint may be impressed in both sections 804 and 806.

It is to be noted that the further information is transmitted in the embodiment shown in FIG. 8 unencrypted which allows obtaining the expected fingerprint at the receiver without having to apply complicated decryption algorithms. Thus, if the fingerprint identifier information is provided only in section 804, the validation of the transmitted data packet can be provided by a processing element such as the processing element 308 in combination with the registers storing the RSSI power levels at the receiver without having to wake up an application controller such as the application controller 110. Thus, the application controller may only be activated when the received data packet has already been validated which allows saving energy in case the system is under attack. In addition, the configurable fingerprint provides additional security against relay attacks.

Figure 9:
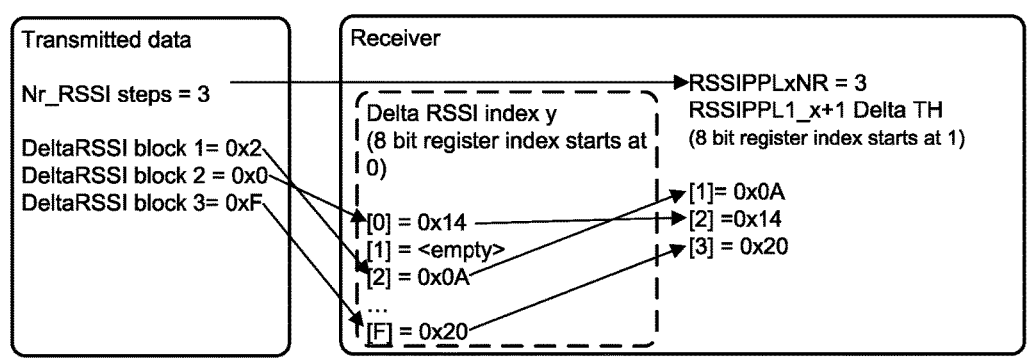
FIG. 9 is an example of an application of a rule to generate an expected fingerprint.

Referring now to FIG. 9, an example embodiment of a rule which may be used for generating the expected fingerprint as a sequence of RSSI power levels from the transmitted further fingerprint identifier information will be explained.

The embodiment of FIG. 9 shows an example of further information contained in the blocks 804*b*. The example of further information includes three RSSI steps as indicated by the value of Nr_RSSI steps transmitted in block 804*a*. In the received data packet, a first identifier value 0x2 is provided in the first block Delta RSSI block 1, a second identifier value 0x0 is provided in the second Delta RSSI block 2 and a third identifier 0xF is provided in the in the third block Delta RSSI block 3. In the described embodiment, the transmitted identifiers correspond to register addresses. Therefore, the corresponding difference power levels of the expected RSSI power level sequence can be obtained by extracting the relative difference power level stored in the register address of the first identifier. As the first identifier value corresponding to the first power level step is 0x2, the expected value of the first difference power level step is obtained by looking up the value stored in the register which has the register address 0x2. In this embodiment, the value stored in the register with register address 0x2 is 0x0A. Thus the expected first Delta RSSI step of the sequence of power level steps is 0x0A. In the same manner, the second value of the expected second Delta RSSI step can be looked up by accessing the register having the register address transmitted in the second Delta RSSI block 2 (0x0) and extracting the value stored therein. In general the nth value of the expected nth Delta RSSI step can be looked up by accessing the register having the register address transmitted in the nth Delta RSSI block n (for example for n=3 block 3 points to 0xF for n=3) and extracting the value stored therein, wherein can in general include any integer number. In this manner the expected Delta RSSI sequence can be obtained and compared with the received Delta RSSI sequence based on the measurement of peak power levels.

It is to be understood that the configurable fingerprint mechanism described above may be used in combination with a receiver or methods shown and explained in embodiments of FIGS. 1 to 5. Furthermore, it is to be understood that the configurable fingerprint mechanism may in addition also be used in receivers which are structural or functional different to the receivers and methods shown and described with respect to FIGS. 1 to 5.

Although the disclosure has been shown and described with respect to one or more implementations, equivalent alterations and modifications will occur to others skilled in the art based upon a reading and understanding of this specification and the annexed drawings. Further, it will be appreciated that identifiers such as "first" and "second" do not imply any type of ordering or placement with respect to other elements; but rather "first" and "second" and other similar identifiers are just generic identifiers. In addition, it will be appreciated that the term "coupled" includes direct and indirect coupling. The disclosure includes all such modifications and alterations and is limited only by the scope of the following claims. In particular regard to the various functions performed by the above described components (e.g., elements and/or resources), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. In addition, the articles "a" and "an" as used in this application and the appended claims are to be construed to mean "one or more". It is further to be understood that the term "fingerprint" may include any form of unique information which may be impressed on the transmitted data packet without changing the digital content of the data packet. Furthermore, it is to be understood that the term "fingerprint identifier information" may include any information transmitted within the data packet which allows the intended receiver to determine an expected fingerprint for the data packet based on a pre-known mechanism.

Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:
   receiving a wireless data packet signal from a transmitter, the data packet signal including a data packet, the data packet including payload data and further information;
   determining, from received signal strength values of the data packet signal, first information related to a sequence of received signal strength levels in different data packet portions;
   extracting the further information from the received data packet;
   determining, based on the further information included in the data packet, second information related to a sequence of expected signal strength levels in the different data packet portions; and
   determining whether the first information corresponds to the second information.

2. The method according to claim 1, wherein each signal strength level of the sequence of received signal strength levels relates to a signal strength level of a data packet portion.

3. The method according to claim 2, wherein each specific data packet portion includes a specific bit set of payload data.

4. The method according to claim 1, further comprising: verifying a data packet transmission based on the determining whether the first information corresponds to the second information.

5. The method according to claim 1, wherein the sequence of received signal strength levels relates to a sequence of signal strength levels associated with a sequence of data packet portions.

6. The method according to claim 5, wherein the sequence of received signal strength levels relates to a sequence of difference signal levels, wherein each difference signal level of the sequence of difference signal levels relates to a difference in signal strength levels in adjacent data packet portions of the sequence of data packet portions.

7. The method according to claim 1, wherein the further information is generated by the transmitter based on random or pseudo-random information.

8. The method according to claim 1, wherein the further information includes a number of elements in the sequence of signal strength levels.

9. The method according to claim 1, wherein the sequence of received signal strength levels of the data packet signal corresponds to a sequence of signal strength levels in predetermined portions of the data packet.

10. The method according to claim 1, wherein the further information is generated based on signal strength information and a rule applied to the signal strength information, the rule being pre-known to the receiver and transmitter.

11. The method according to claim 10, wherein the rule includes an assignment of predetermined storage location identifiers to identify predetermined storage locations in which predetermined signal strength values are stored at the receiver.

12. The method according to claim 11, wherein the storage locations are registers.

13. The method according to claim 10, wherein the rule includes a selection rule which assigns to each signal strength an identifier which identifies a specific register address in which a specific power level value is stored at the receiver.

14. The method according to claim 10, wherein the transmitter is capable to generate for each data packet transmitted a different signal strength sequence.

15. The method according to claim 10, wherein the rule includes a selection rule, the selection rule determining which data packets portions of a sequence of portions with different signal levels are to be used in an authentication.

16. The method according to claim 1, wherein an authentication of the data packet uses at least one further parameter which changed with each transmission of data packets between the transmitter and receiver.

17. The method according to claim 10, wherein the rule includes a rule to determine a selection rule used for determining the signal strength information and/or a data packet portion related to the signal strength information.

18. The method according to claim 1, wherein the data packet comprises a payload data field, the payload data field including a first portion provided for the further information and a second portion provided for other data.

19. The method according to claim 1, wherein the further information is transmitted unencrypted.

20. The method according to claim 1, wherein the method is implemented in a keyless entry system.

21. A transmitter device comprising:
a data packet generator, the data packet generator configured to form a data packet including data and further information, the further information being related to a sequence of signal strength levels in different data packet portions by a predetermined rule; and
a transmission signal generator, the transmission signal generator being configured to modulate the data packet on a wireless carrier signal and to provide a sequence of different signal strength levels in different data packet portions in correspondence with the sequence of signal strength levels.

22. The transmitter device according to claim 21, wherein the transmitter device is configured to determine a sequence of signal strength levels and to generate the further information based on to the sequence of signal strength levels and a pre-defined rule applied to the sequence of signal strength levels.

23. The transmitter device according to claim 21, wherein the transmitter device is configured to determine the sequence of signal strength levels at least partially based on random or pseudo-random information.

24. A method comprising:
transmitting a wireless data packet from a transmitter to a receiver, wherein transmitting the wireless data packet comprises:
modulating the data packet on a wireless carrier signal to obtain a wireless modulated transmission signal; and
impressing a signal strength fingerprint on different data packet portions of the modulated transmission signal, wherein the impressed signal strength fingerprint is related to fingerprint identifier information included in the data packet by a rule pre-known to the transmitter and receiver.

25. A receiver device comprising:
a receiver circuit to receive a data packet including data and further information;
a circuit to determine first information related to a sequence of signal strength levels, the sequence of signal strength levels corresponding to signal strength levels measured in different portions of the data packet;
a processing circuit to extract the further information from the data packet and to determine from the further information second information related to an expected sequence of signal strength levels in different portions of the data packet; and
a validation circuit to validate the data packet, the validation circuit being configured to validate the data packet based on a comparing of the first information with the second information.

* * * * *